(12) United States Patent
Park (10) Patent No.: US 7,794,106 B2
(45) Date of Patent: Sep. 14, 2010

(54) BACK LIGHT UNIT AND DISPLAY APPARATUS HAVING THE SAME

(75) Inventor: Seong-ho Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 11/778,147

(22) Filed: Jul. 16, 2007

(65) Prior Publication Data

US 2008/0157700 A1 Jul. 3, 2008

(30) Foreign Application Priority Data

Jan. 2, 2007 (KR) ...................... 10-2007-0000253

(51) Int. Cl.
*F21V 23/02* (2006.01)
(52) U.S. Cl. ..................... 362/221; 362/225; 362/97.1
(58) Field of Classification Search ................. 362/29, 362/30, 97.1, 97.2, 217.08, 217.09, 221, 362/225, 260, 561; 439/79
See application file for complete search history.

(56) References Cited

U.S. PATENT DOCUMENTS 4,486,689 A * 12/1984 Davis et al. ................... 315/92

| 6,280,206 B1* | 8/2001 | Kuroda et al. | 439/79 |
| 2004/0155601 A1* | 8/2004 | Chou et al. | 362/221 |
| 2008/0002392 A1* | 1/2008 | Kim | 362/97 |

FOREIGN PATENT DOCUMENTS

| KR | 10-2003-0088646 A | 11/2003 |
| KR | 10-2003-0089533 A | 11/2003 |
| KR | 10-2004-0014081 A | 2/2004 |

* cited by examiner

*Primary Examiner*—Y My Quach Lee
(74) *Attorney, Agent, or Firm*—Sughrue Mion, PLLC (57) ABSTRACT

A back light unit for a display apparatus having a power supply includes: a lamp part having a plurality of lamps; and an inverter board which is provided on a path through which power is supplied from the power supply to the lamp part, and includes a connector assembly provided on one side of the inverter board, the connector assembly including at least one female connector in which a plurality of socket accommodators provided to supply the power to the lamps is formed as one body, and at least one male connector on which a plurality of socket connectors connected to the socket accommodators is formed as one body.

20 Claims, 9 Drawing Sheets

BACK LIGHT UNIT AND DISPLAY APPARATUS HAVING THE SAME

CROSS-REFERENCE TO RELATED APPLICATIONS

This application claims priority from Korean Patent Application No. 10-2007-0000253, filed on Jan. 2, 2007 in the Korean Intellectual Property Office, the disclosure of which is incorporated herein by reference.

BACKGROUND OF INVENTION

1. Field of Invention

Apparatuses consistent with the present invention relate to a back light unit and, more particularly, to a back light unit improving a connection structure of a connector, and a display apparatus having the same.

2. Description of the Related Art

Recently, a screen in a display apparatus such as a television (TV), a personal computer (PC) and so on gets larger as well as lighter and slimmer. For this, a flat type display apparatus like a Liquid Crystal Display (LCD) is developed instead of a Cathode Ray Tube (CRT) and is widely used in the TV, etc.

An LCD panel of the display apparatus includes a first substrate having a pattern of a matrix and a second substrate facing the first substrate. A liquid crystal material having an anisotropic permittivity is inserted between the first and second substrates. Also, an electric field is formed between the first and second substrates. Therefore, the intensity of the electric field is adjusted such that the quantity of the light penetrating the substrates is controlled to display an image to be seen on the liquid crystal display.

Here, since the LCD panel does not emit light by itself, the LCD panel includes a back light unit having a lamp or so on at a rear side thereof. The back light unit to illuminate a large size display apparatus such as a TV needs to have a property of high brightness and an ability of illuminating a larger screen.

There are two different types of back light units: a direct type and an edge type according to a position of a light source. In case of the edge type, the light source is installed at a side of a light guide plate. The edge type is mainly applied to the back light unit of a relatively small size LCD apparatus such as a laptop and a desk top computer. The back light unit of the edge type has advantages in durability, thickness and uniformity of light on the screen compared with the direct type.

The lamp of the back light unit is driven by an inverter board which transforms a voltage supplied to the lamp. Also, in an large size LCD apparatus, the inverter board for the lamp drives at least one or two lamps. The lamp and the inverter board for the lamp may be extended with multiple inverter boards provided therein.

However, a related art inverter board for the lamp has connecters connected to the respective lamps individually so that the structure thereof is complex and the number of components is increased. Furthermore, if at least one connector cannot be connected or is not inserted to the lamp, the lamp is not turned on so that the LCD apparatus may not properly work.

SUMMARY OF THE INVENTION

Accordingly, it is an aspect of the present invention to provide a back light unit and a display apparatus having a simple connecting structure for a connector assembly and having a reduced number of components, and a display apparatus having the same.

Another aspect of the present invention is to provide a back light unit capable of preventing a lamp from a malfunction due to disconnecting or improper inserting of the connector assembly, and the display apparatus having the same.

In addition, another aspect of the present invention is to provide a back light unit having an inverter board which is capable of supplying a high voltage to a lamp part through a short path with high efficiency, and the display apparatus having the same.

Additional aspects of the present invention will be set forth in part in the description which follows and, in part, will be obvious from the description, or may be learned by practice of the present invention.

The foregoing and/or other aspects of the present invention can be achieved by providing a back light unit for a display apparatus having a power supply, the back light unit comprising: a lamp part which comprises a plurality of lamps; and an inverter board which is provided on a path through which power is supplied from the power supply to the lamp part, and comprises a connector assembly provided on one side of the inverter board, the connector assembly comprising at least one female connector in which a plurality of socket accommodators provided to supply the power to the lamps is formed as one body, and at least one male connector on which a plurality of socket connectors connected to the socket accommodators is formed as one body.

According to an aspect of the invention, the number of the lamps is $2^n$ (n: natural number).

According to an aspect of the invention, each lamp comprises a hot terminal and a cold terminal, and each socket connector comprises a hot socket connector and a cold socket connector which are electrically connected to the hot terminal and the cold terminal, respectively.

According to an aspect of the invention, a hot pin and a cold pin which are electrically connected to the hot terminal and the cold terminal of each lamp are provided in each socket accommodator of the female connector.

According to an aspect of the invention, the female connector is provided on the inverter board, and is arranged on a side of the hot terminal.

According to an aspect of the invention, the inverter board further comprises a transformer which is provided on the inverter board and transforms the power supplied from the power supply, and the transformer and the female connector are formed as one body.

According to an aspect of the invention, the transformer is arranged substantially parallel with the female connector, and disposed a predetermined distance from the female connector on the inverter board.

According to an aspect of the invention, the transformer is partitioned to correspond to the respective lamps.

According to an aspect of the invention, the female connector comprises a first spacer which is provided between the socket accommodators and separates the socket accommodators.

According to an aspect of the invention, the male connector comprises a second spacer which is located to correspond to the first spacer.

According to an aspect of the invention, the number of the socket accommodators is four.

According to an aspect of the invention, the number of the socket connectors is four.

The foregoing and/or other aspects of the present invention can be achieved by providing a display apparatus comprising:

a power supply; a lamp part which comprises a plurality of lamps; and an inverter board which is provided on a path through which power is supplied from the power supply to the lamp part, and comprises a connector assembly provided on one side of the inverter board, the connector assembly comprising at least one female connector in which a plurality of socket accommodators provided to supply the power to the lamps is formed as one body, and at least one male connector on which a plurality of socket connectors connected to the socket accommodators is formed as one body.

According to an aspect of the invention, the number of the lamps is $2^n$ (n: natural number).

According to an aspect of the invention, each lamp comprises a hot terminal and a cold terminal, and each socket connector comprises a hot socket connector and a cold socket connector which are electrically connected to the hot terminal and the cold terminal of the lamp, respectively.

According to an aspect of the invention the inverter board further comprises a transformer which is provided on the inverter board and transforms the power supplied from the power supply, and the transformer and the female connector are formed as one body.

According to an aspect of the invention, the transformer is arranged substantially parallel with the female connector, and disposed a predetermined distance from the female connector on the inverter board.

According to an aspect of the invention, the transformer is partitioned to correspond to the respective lamps.

According to an aspect of the invention, the female connector comprises a spacer which is provided between the socket accommodators and separates the socket accommodators.

According to an aspect of the invention, the number of the socket accommodators is four.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

As shown in FIGS. 1 to 6, a display apparatus 100 according to an exemplary embodiment of the present invention includes a power supply 150 and a back light unit 160. The display apparatus 100 includes a liquid crystal display (LCD) panel 110.

Figure 1:
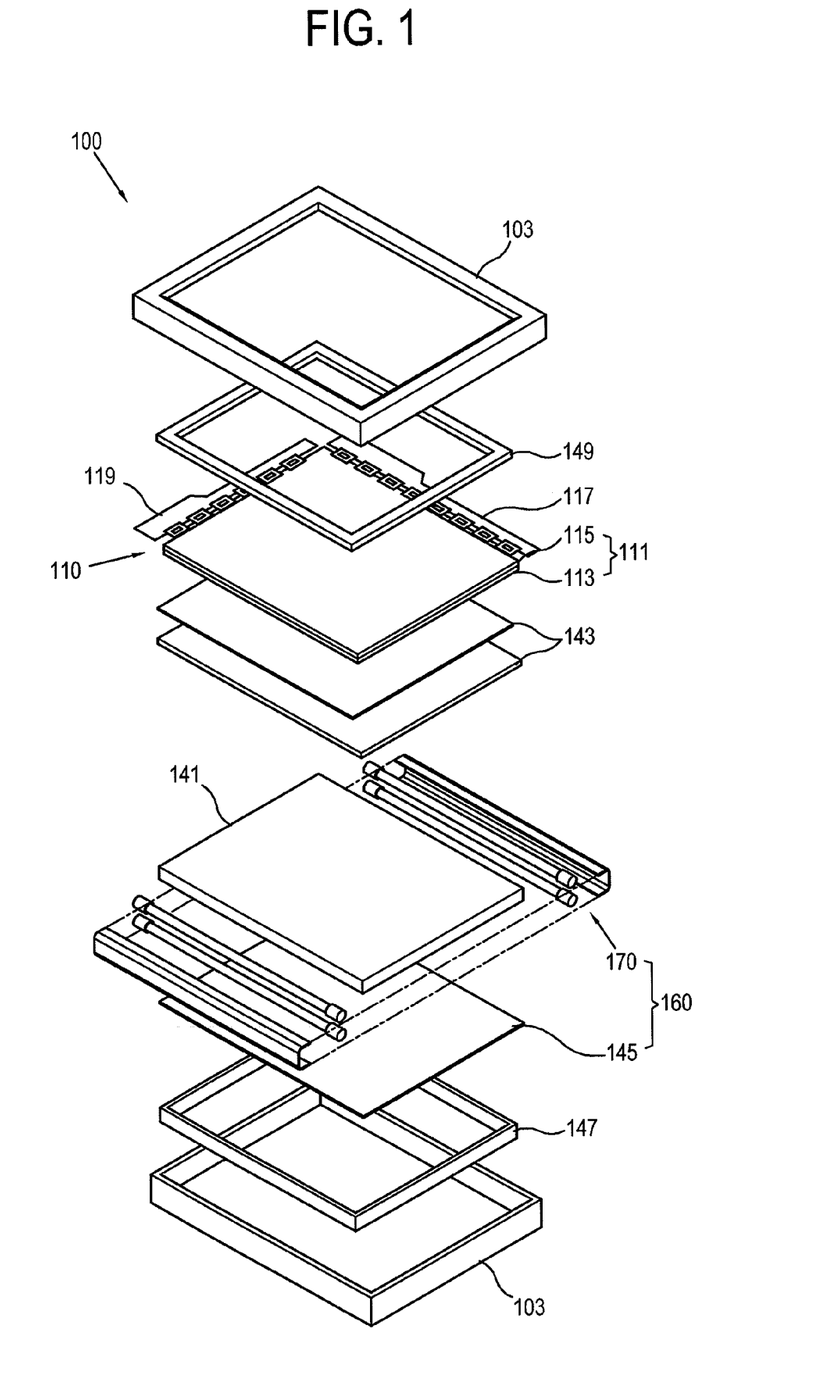
FIG. 1 is an exploded perspective view of a display apparatus according to an exemplary embodiment of the present invention.

The LCD panel 110 which displays an image by receiving an image signal is shown in FIG. 1. The LCD panel 110 includes a panel 111, a data side print circuit board (not shown), a gate side print circuit board (not shown), a data side Tape Carriage Package (TCP) (not shown) and a gate side TCP (not shown).

The panel 111 includes a Thin Film Transistor (TFT) substrate 113, a color filter substrate 115 and a liquid crystal (not shown), and forms the image.

The TFT substrate 113 is a transparent glass substrate on which a TFT matrix is formed. A source terminal of a TFT is connected to a data line, and a gate terminal is connected to a gate line. Also, a pixel electrode including Indium Tin Oxide (ITO) which is a transparent conductive material is disposed at a drain terminal. Accordingly, if an electric signal is inputted to the data line and the gate line, the electric signal is inputted to the source terminal and the gate terminal of the TFT. By input of the electric signal, the TFT is turned on or off so that the drain terminal outputs the electric signal for forming a pixel.

The color filter substrate 115 is provided to be opposite to the TFT substrate 113. Between the TFT substrate 113 and the color filter substrate 115, liquid crystals are provided. The color filter substrate 115 is formed by a thin film process of red (R), green (G) and blue (B) pixels which are color pixels generating predetermined colors when light passes through the color filter substrate 115. Common electrodes having ITO are spread on a front side of the color filter substrate 115.

If the gate and source terminals of a TFT on the TFT substrate 113 receive power and the TFT is turned on, an electric field is generated between the pixel electrode and the common electrode of the color filter substrate 115. Because of the electric field, an arrangement angle of a liquid crystal inserted between the TFT substrate 113 and the color filter substrate 115 is changed. Then, light permeability is changed according to the changed arrangement angle such that the intended image is generated.

Here, a data side print circuit board 117 and a gate side print circuit board 119 generate a gate driving signal to drive the LCD panel 110, a data signal and a plurality of timing signals to timely transmit the gate driving signal and the data signal. Furthermore, the gate driving signal is inputted to the gate line of the LCD panel 110 through the gate side TCP, and the data signal is inputted to the data line of the LCD panel 110 through the data side TCP.

The size of a light guide plate 141 corresponds to the panel 111 of the LCD panel 110. The light guide plate 141 is disposed below the panel 111 and changes a light path while guiding the light generated in a lamp part 170 to the panel 111. The light guide plate 141 according to an exemplary embodiment of the present invention is of an edge type, and has a uniform thickness, and the lamp part 170 is installed in opposite sides of the light guide plate 141 to increase light efficiency. The number of lamps 171 of the lamp part 170 may be properly arranged in consideration of the size of the LCD panel 110, brightness of the displayed image, overall balance and so on.

An optical sheet 143 is provided above the light guide plate 141 and makes uniform the brightness of the light from the light guide plate 141 to the LCD panel 110. More than one optical sheet may be provided.

A reflecting plate 145 is provided below the light guide plate 141 and reflects the light leaking from the light guide plate 141 to the light guide plate 141 to increase light efficiency A mold frame 147 accommodates and supports the LCD panel 110 and the back light unit 160. Here, the back light unit 160 and the LCD panel 110 may be separately supported. The mold frame 147 has a form of a rectangular parallelepiped, and a top side of the mold frame 147 is opened.

A chassis 149 is opened at a top side to expose the LCD panel 110, and a side thereof is bent toward an inner vertical direction to protect around a top side of a periphery part of the LCD panel 110.

The power supply 150 supplies power supplied from an outside to the LCD panel 110 and the back light unit 160 and so on.

The back light unit 160 is disposed below the LCD panel 110 and provides uniform light to the LCD panel 110. The back light unit 160 includes the lamp part 170 generating the light and an inverter board 210. The back light unit 160 further includes a transformer 215.

In the display apparatus 100, a casing 103 is also provided.

The lamp part 170 includes the lamp 171.

Figure 2:
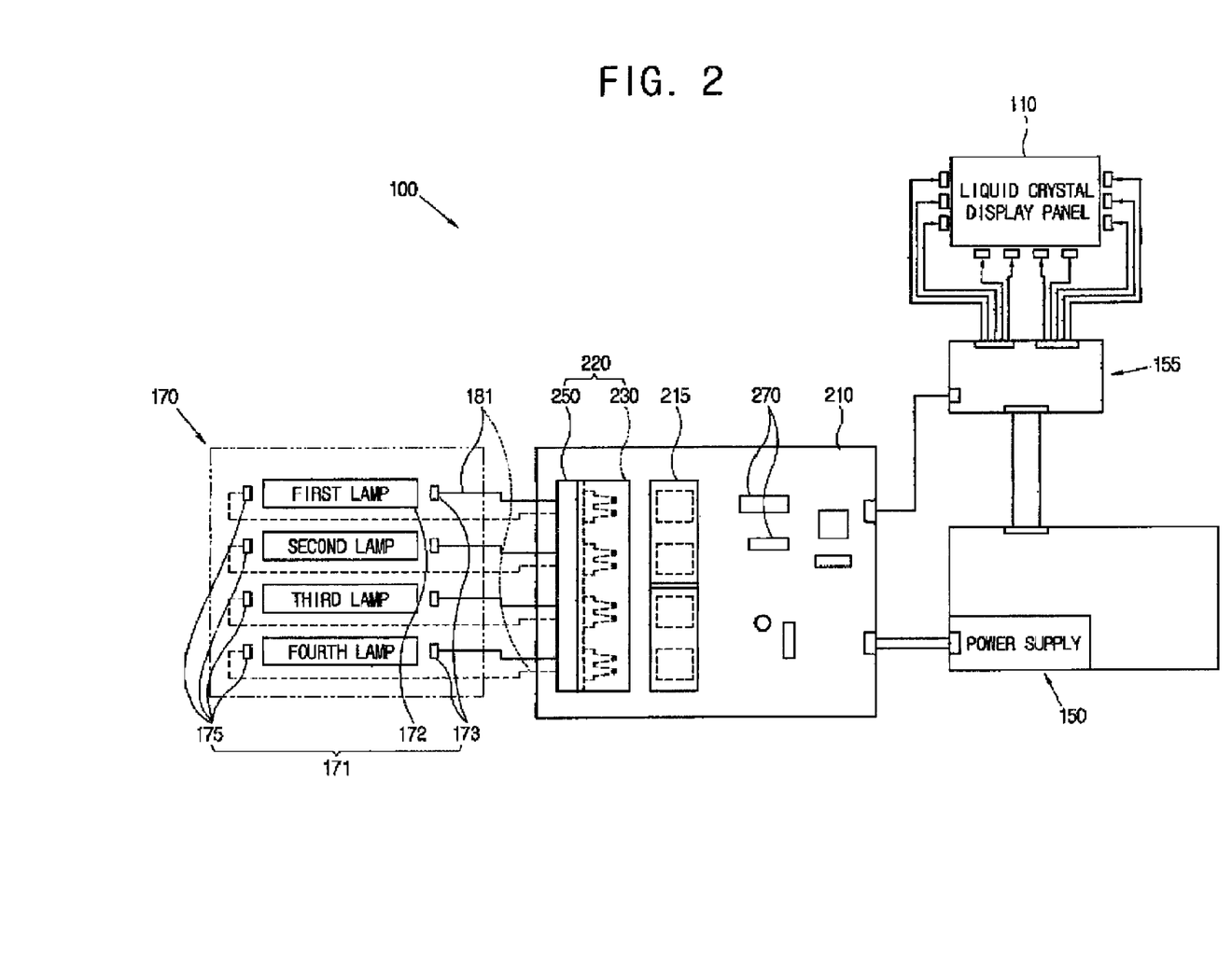
FIG. 2 is a schematic view showing a system of the display apparatus having an inverter board according to an exemplary embodiment of the present invention.

If the lamp part 170 is supplied with power by a ground method, it is more efficient that the inverter board 210 is located at a hot terminal 173 side of the lamp part 170 than at a cold terminal 175 side. The power supplied to the respective terminals of the lamp part 170 from the inverter board 210 is very high. According to the ground method, the power supplied to the hot terminal 173 is very high and the power supplied to the cold terminal 175 is equal or similar to a ground voltage.

Accordingly, because a high voltage has to be applied from a male connector 250 of the inverter board 210 to the hot terminal 173 of the lamp part 170, it is better that a distance between the male connector 250 and the hot terminal 173 of the lamp part 170 is relatively small.

The lamps 171 are arranged in parallel to each other and generate the light. The lamp 171 includes an External Electrode Fluorescent Lamp (EEFL), a Cold Cathode Fluorescent Lamp (CCFL) or so on which is a line light source. The lamp 171 may include a light emitting diode if it is necessary. This kind of light source receives electric energy to emit heat as well as the light.

The number of the lamps 171 may be $2^n$. Herein, n is a natural number and the number of the lamps 171 may be 2, 4, 8, 16 or so on. It has been described that the number of the lamps 171 is 4 as an example of the present invention, but it is also possible that the number of the lamps 171 may be 8, 16, 32 or so on.

The lamp 171 includes a lamp body 172, the hot and cold terminals 173 and 175 respectively provided at opposite terminals of the lamp 171 and connected to the lamp body 172. There may be an electric field difference between the hot terminal 173 and the cold terminal 175 because of a difference of voltages supplied to the hot terminal 173 and the cold terminal 175. The electric field difference has a sufficient value to generate discharge between an electrode of the lamp 171 connected to the hot terminal 173 and an electrode connected to the cold terminal 175. For example, 650-950 Vrms (Root Mean Square Voltage) may be supplied to the hot terminal 173 and 5 Vrms may be supplied to the cold terminal 175.

Therefore, if a voltage is supplied to the hot terminal 173 and the cold terminal 175, discharge is generated because of the electric field difference of the electrodes of the lamp body 172 connected to the respective terminals so that light is generated from the lamp body 172.

As shown in FIG. 2, the hot terminal 173 is electrically connected to a right-hand side electrode of the lamp body 172 so that the hot terminal 173 is electrically connected to a female connector 230 through a cable 181. The power applied to the hot terminal 173 may be higher than the power to the cold terminal 175.

As shown in FIG. 2, the cold terminal 175 is electrically connected to a left-hand side electrode of the lamp body 172 and electrically connected to the female connector 230 through the cable 181.

In the lamp part 170, a plurality of lamps 171 is provided, and the respective electrodes of the lamps are electrically connected to the respective hot terminals 173 and the respective cold terminals 175 which are branched from one terminal. In other words, the power is supplied to the plurality of lamps 171 connected to the hot terminal 173 and the cold terminal 175 in the lamp part 170 in parallel.

The cable 181 electrically connects the female connector 230, the hot terminal 173 and the cold terminal 175. The cable 181 may include a Flexible Printed Circuit Board (FPCB) if it is needed.

Figure 3:
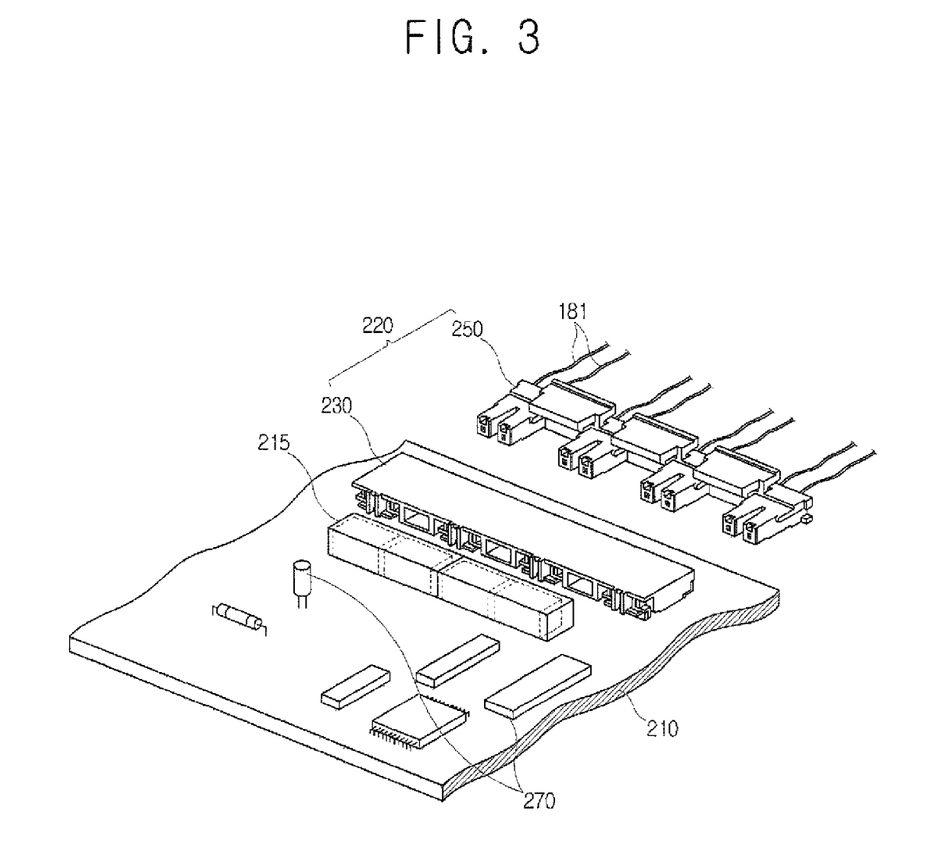
FIG. 3 is an exploded perspective view of the inverter board of FIG. 2, according to an exemplary embodiment of the present invention.

The inverter board 210 includes a board body (not shown) and a connector assembly 220. The inverter board 210 may further include the transformer 215. The inverter board 210 may include an electric component 270 having various kinds of functions.

The transformer 215 includes a transformer body 216, a coil members 217a, 217b, 217c and 217d and a partition wall 219.

The transformer body 216 accommodates the coil members 217a to 217d entirely and has the partition wall 219 to partition the coil members 217a to 217d.

The coil members 217a to 217d are accommodated in the transformer body 216, and transform a voltage supplied from the power supply 150 to a predetermined voltage to supply the predetermined voltage to the hot and cold terminals 173 and 175. The voltage transformed in the coil member 217 is supplied to a hot pin 235 and a cold pin 237.

Herein, the female connector 230 and the transformer 215 may be arranged adjacent to each other on the inverter board 210. In other words, a length of a signal line 213 connected between the female connector 230 and the transformer 215 gets shorter so that a loss that may be generated because of the length of the signal line 213 is reduced. The female connector 230 and the transformer 215 may be arranged substantially in parallel and adjacent to each other. For instance, it may be arranged that the distance between the female connector 230 and the transformer 215 (referring to "D" of FIG. 4) can be 5 mm.

Figure 4:
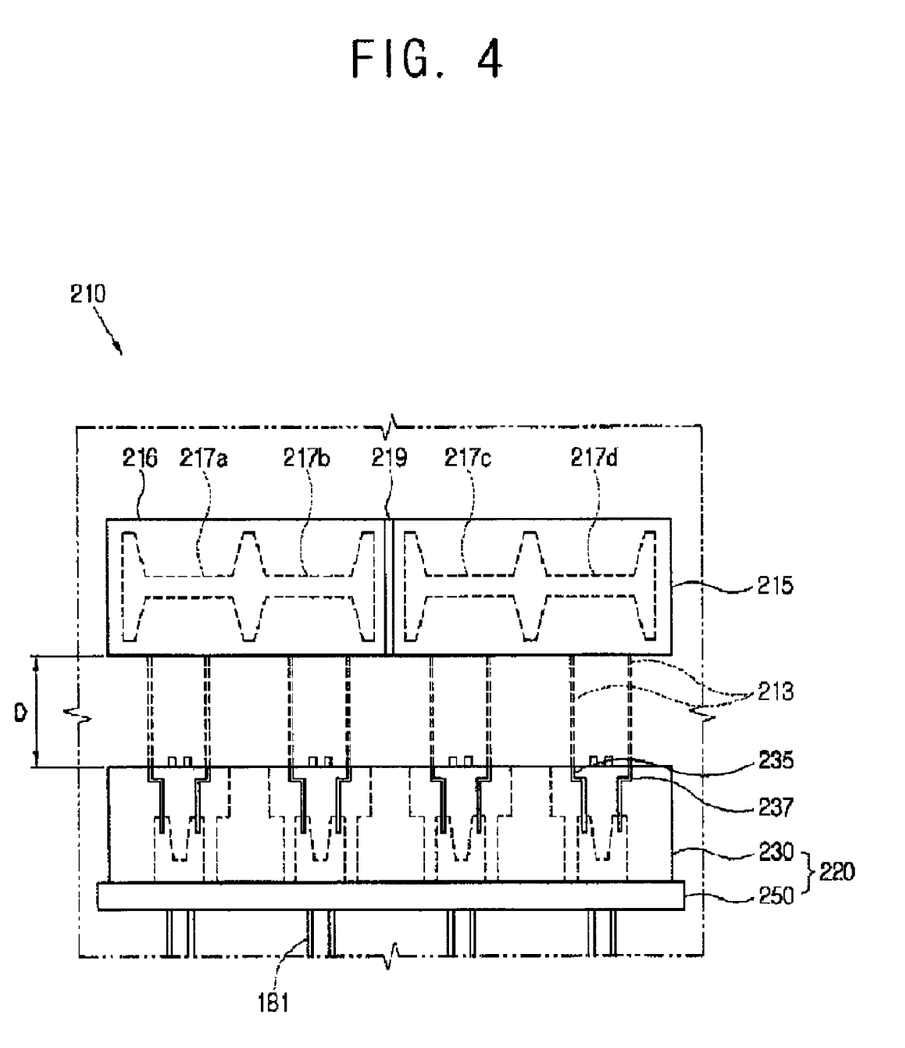
FIG. 4 is a plane view enlarging part of FIG. 3, according to an exemplary embodiment of the present invention.

Therefore, the distance between the transformer 215 and the female connector 230 formed as one body becomes shorter and the length of the signal line 213 formed on the inverter board 210 becomes shorter so that it is convenient to design the signal line 213 of the inverter board 210. Also, the path supplied to the lamp part 170 becomes as short as possible so that the loss that may be generated, if a signal having a high voltage is transmitted, is minimized.

Figure 5:
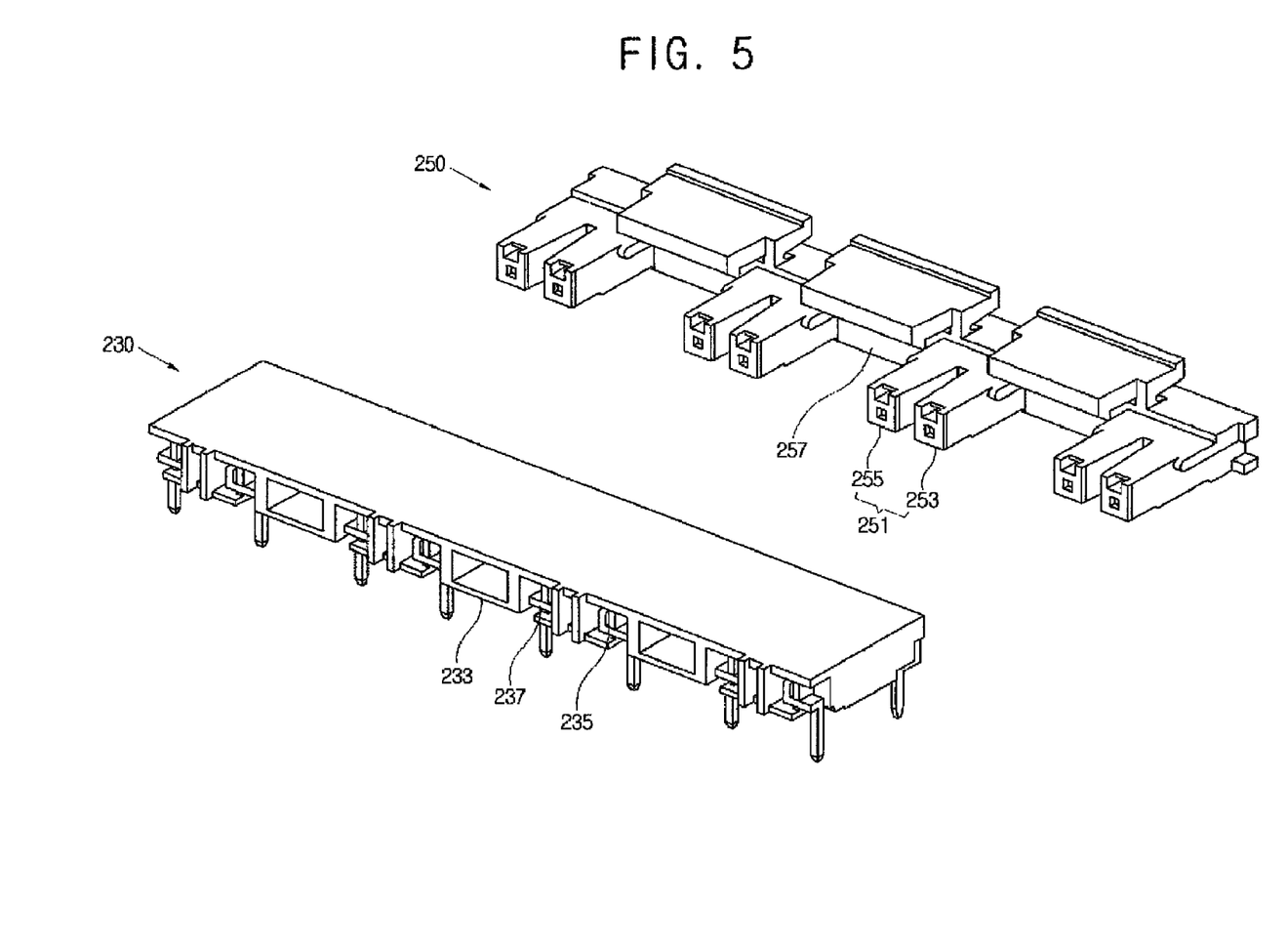
FIG. 5 is an exploded perspective view of a connector assembly of FIG. 4, according to an exemplary embodiment of the present invention.
Figure 6:
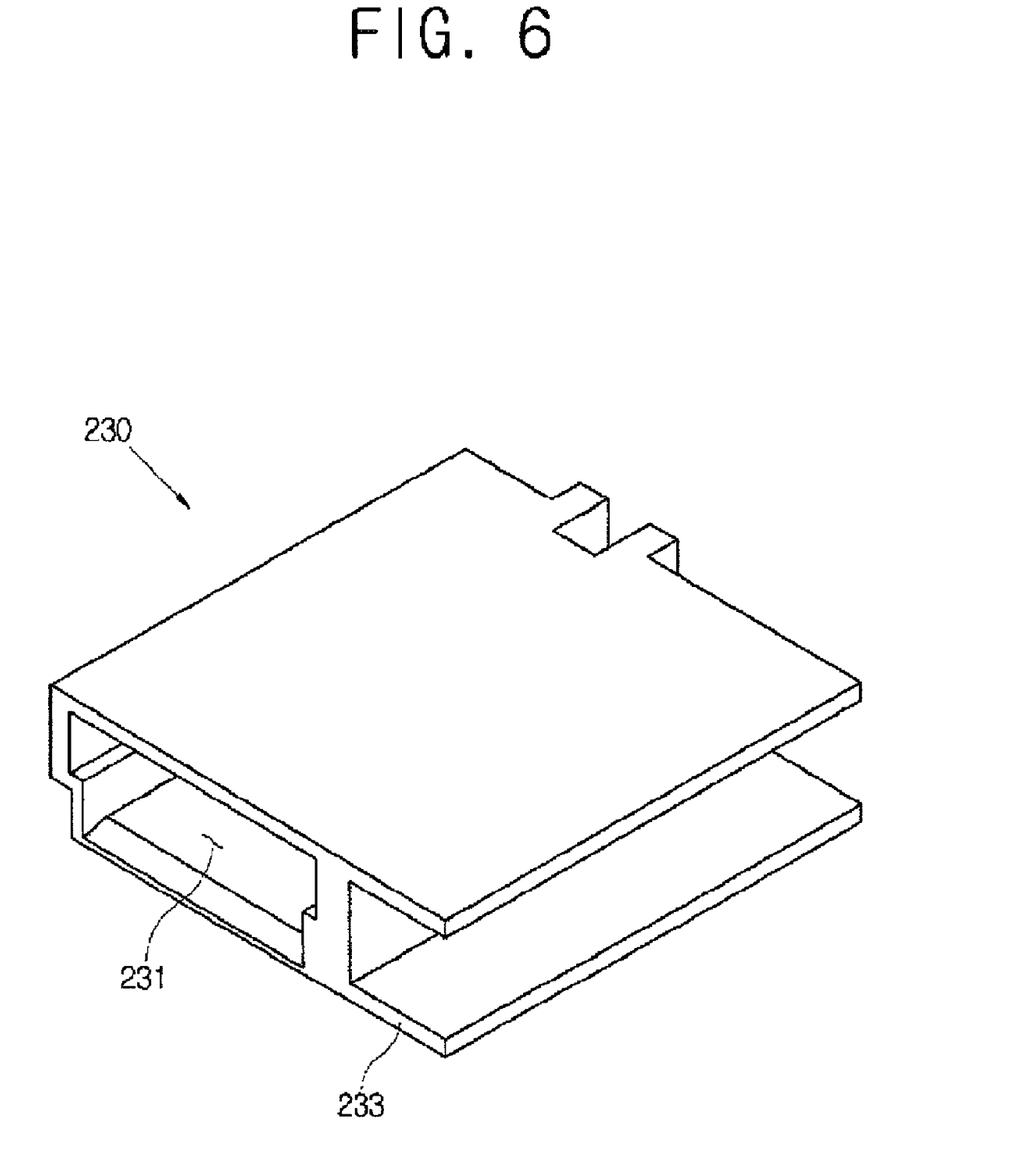
FIG. 6 is a partial perspective view seen from FIG. 5, according to an exemplary embodiment of the present invention.

The connector assembly 220 includes the female connector 230. The connector assembly 220 further includes the male connector 250.

The female connector 230 includes a socket accommodator 231. The female connector 230 further comprises a first spacer 233. The female connector 230 includes the hot pin 235 and the cold pin 237.

The female connector 230 is connected to the inverter board 210 by a known method such as soldering with using the hot pin 235 and the cold pin 237. The female connector 230 may be connected to the inverter board 210 with another member as well as the hot pin 235 and the cold pin 237.

The female connector 230 may include a plurality of socket accommodators 231, and hereinafter the description will be given that the four socket accommodators 231 are formed as shown in FIGS. 4 and 5.

Figure 9:
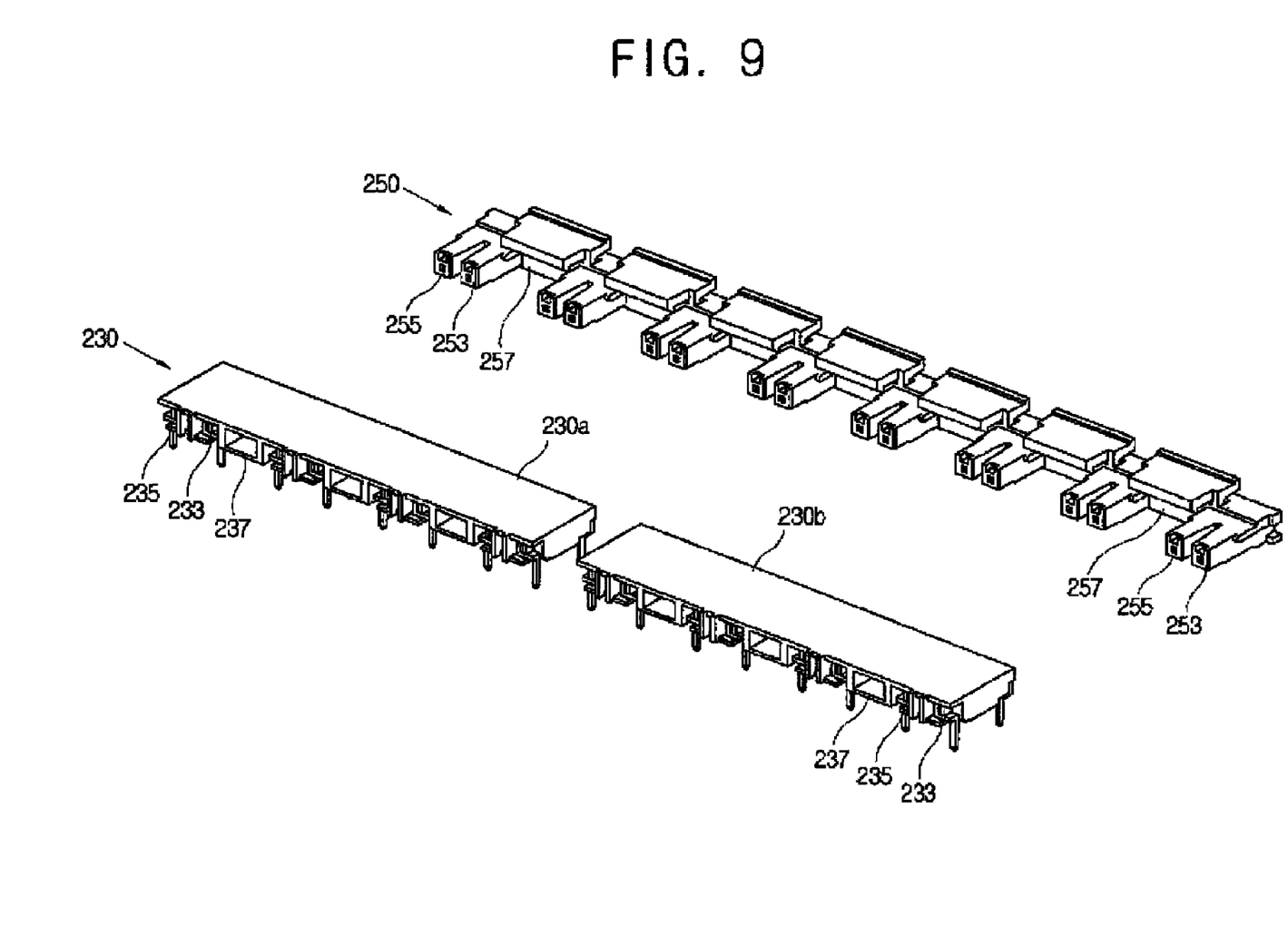
FIG. 9 is an exploded perspective view illustrating another exemplary embodiment of a connector assembly of FIG. 4.

However, as shown in FIG. 9, two female connectors 230, each having four socket accommodators 231, and one male connector 250, having eight pairs of socket connectors 253 and 255 may be connected each other, that is different to the above exemplary embodiment.

The socket accommodator 231 recessed in the female connector 230 accommodates and supports the socket connectors 253 and 255 of the male connector 250. A front side of the socket accommodator 231 has an open part to accommodate the socket connectors 253 and 255, and a rear side of the socket accommodator 231 has an open part through which the respective hot and cold pin 235 and 237 are connected.

The first spacer 233 is provided between the socket accommodators 231 to minimize an effect such as generating electromagnetic waves that may be generated at the cold pin 237 and so on by high power supplied to the hot pin 235. Therefore, a connector structure may become smaller with minimizing an effect such as interruption by the electromagnetic waves etc. that may be generated from the high power and so on.

In other words, as shown in FIG. 4, it may be designed by way of example that the distance between the hot pin 235 and the cold pin 237 is 3.5 mm and the distance between the centers of the respective socket accommodators 231 is 14 mm so that the first spacer 233 can be provided between the socket accommodators 231.

The hot pin 235 is connected to the rear side of the socket accommodator 231 and supplies the power to the hot terminal 173 from the transformer 215.

The cold pin 237 is connected to the rear side of the socket accommodator 231 and supplies the power to the cold terminal 175 from the transformer 215.

Here, the hot pin 235 and the cold pin 237 may be partitioned by the partition wall 219 because a voltage difference between the hot pin 235 and the cold pin 237 is high and the voltage applied to the hot pin 235 is high.

The male connector 250 includes the socket connectors 253 and 255 and a second spacer 257. On a front side of the male connector 250 are formed the plurality of socket connectors 253 and 255, and on a rear side thereof is mounted the cable 181 electrically connected to the respective socket connectors 253 and 255 so that the male connector 250 is electrically connected to the lamp part 170.

Explaining FIG. 9 again, two female connectors 230 may be correspondingly provided for one male connector 250.

A socket connector 251 including the socket connectors 253 and 255 accommodates a socket 259 electrically connected to the hot pin 235 and the cold pin 237. The socket connector 251 is extended long and branched, and includes the socket connectors 253 and 255. Here, the socket connector 253 is a hot socket connector connected to the hot pin 235, and the socket connector 255 is a cold socket connector connected to the cold pin 237.

The socket 259 is a conductor electrically connected to the hot pin 235 and the cold pin 237.

Accordingly, the male connector 250 and the female connector 230 to supply the power to the lamp 171 are formed as one body and the number of components may be reduced. Furthermore, when the connectors are assembled and disassembled, the cost may be reduced. Also, a reliability of a product may be increased because the connectors are connected and disconnected at one time, and prevented from being connected improperly.

The electric component 270 includes a condenser, a capacitor and so on.

Figure 8:
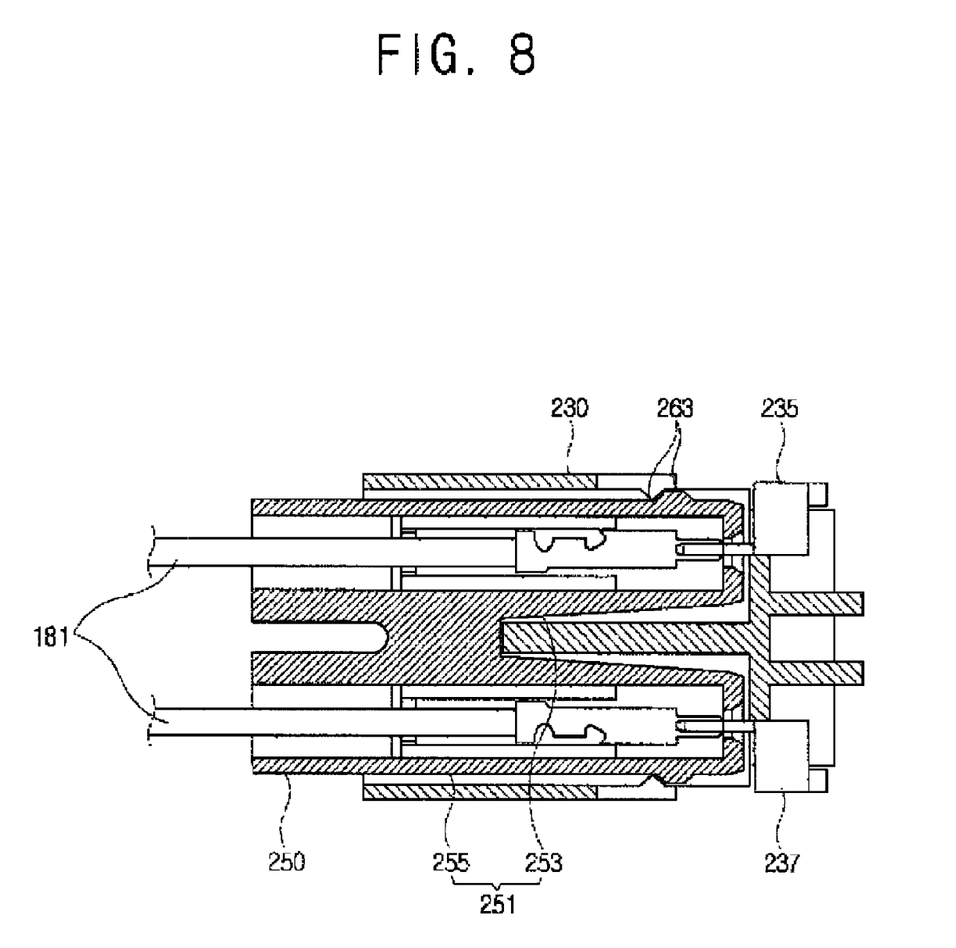

A connecting member 263 is provided to connect the male connector 250 and the female connector 230 as shown in FIG. 8.

Hereinafter, an operation process and an assembling process of the display apparatus 100 are described by referring to FIGS. 7 and 8.

First, a connecting process of the male connector 250 and the female connector 230 is described.

Figure 7:
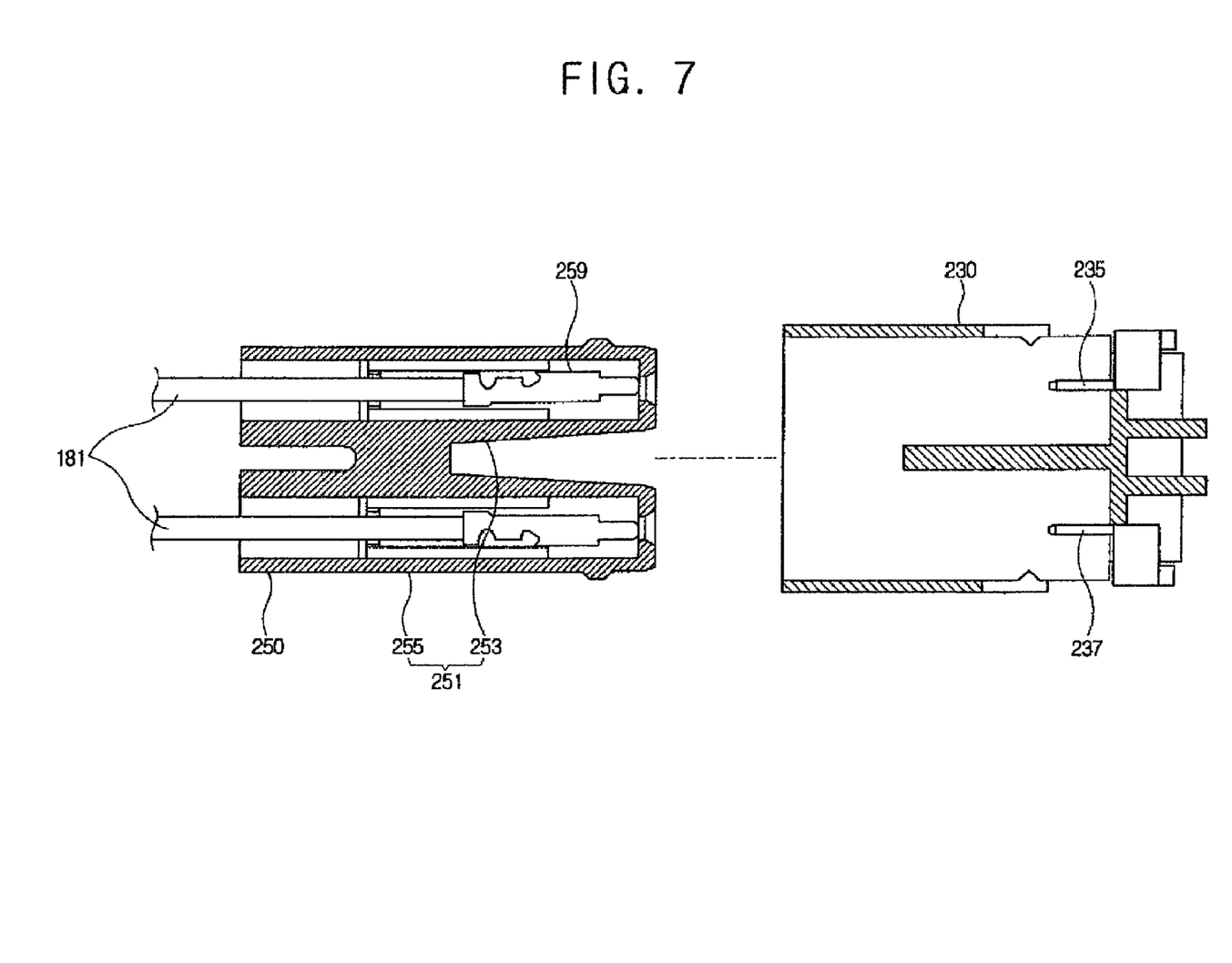
FIGS. 7 and 8 are section views illustrating assembly processes of FIG. 5, according to an exemplary embodiment of the present invention.

As shown in FIG. 7, the female connector 230 is located close to the male connector 250 in the inverter board 210. Then, the female connector 230 is pushed toward the male connector 250.

As shown in FIG. 8, the hot pin 235 and the cold pin 237 are electrically connected to the socket 259 by connecting the female connector 230 to the male connector 250. Then, whether the male connector 250 and the female connector 230 are completely connected may be checked through hearing a connecting sound of the connecting part 263 or watching with naked eye.

If at least one couple of pin and socket is not connected each other in the connector assembly 220, the voltage at the pin and socket which are not connected each other may be controlled to increase by a controller (not shown) so that the operation of the entire lamps 171 may stop.

Accordingly, the structure of the connector assembly 220 is simplified so that an operation such as assembling may become simple and the number of the components may also be reduced. Furthermore, it may be inspected at once whether the connector assembly 220 is properly connected inside so that inspection can be convenient and improper connection can be prevented. Accordingly, the reliability of the product may be increased.

Hereinafter, an operation process of the display apparatus 100 of the present invention is described. First, as shown in FIG. 2, if the power is supplied, the power is supplied to the power supply 150. The power supplied to the power supply 150 is applied to the inverter board 210 to drive the electric component 270 and the transformer 215. Next, the coil member 217 of the transformer 215 transforms the supplied power to power which is proper to other parts, and supplies the transformed power to the hot pin 235 and the cold pin 237 of the male connector 250. Then, the power transformed in the coil member 217 is supplied to the hot terminal 173 and the cold terminal 175 by the socket connectors 253 and 255 connected to the socket accommodator 231 of the female connector 230. Then, an electric discharge is caused inside the lamp body 172 by the voltage difference supplied to electrodes of the lamp body 172 so that the light is generated.

During the above processes, a control board 155 may control the operation of the electric component 270, the transformer 215 and so on, or an amount of the transformed voltage and so on.

At the same time, the power supplied from the power supply 150 is supplied to the LCD panel 110 through the control board 155 so that the image may be formed on the panel 111 by the light emitted from the back light unit 160.

Here, as described above, the arrangement between the inverter board 210 and the lamp part 170 may be optimized and the arrangement between the inverter board 210 and the transformer 215 may become efficient. Therefore, the path of the power supplied from the inverter board 210 becomes shorter and the loss according to the signal transmission becomes reduced.

As described above, the back light unit 160 and the display apparatus 100 having the same according to an exemplary embodiment of the present invention are described to be an edge type but the present invention may be applied to a direct type as well.

Although the above exemplary embodiment is described that a power supplying method of the lamp part 170 is a ground method, a floating method is also applied to the power supplying method. In the case of the floating method, the hot terminal and the cold terminal receive a voltage of a same magnitude but an opposite polarity, respectively. Here, the lamp connector of the inverter board may be located at a center of the lamp part. Although FIG. 1 illustrates that the lamp part and the inverter board are located on the same plane, but actually the lamp part and the inverter board are located on the different plane at the rear side of the LCD panel 110. Accordingly, the inverter board may be located at a center of the lamp part.

As described above, the connecting structure of the lamp connector may be simplified according to an exemplary embodiment of the present invention.

Also, due to reducing the number of the components the cost of assembly and so on may be reduced.

Furthermore, because a malfunction according to improper connection and insertion may be reduced so that the reliability of the products may be increased.

In addition, because the arrangement of the connector assembly, the transformer and the lamp is efficient, the design is optimal and the loss of supplying power is reduced.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A back light unit for a display apparatus having a power supply, the back light unit comprising:
   a lamp part which comprises a plurality of lamps; and
   an inverter board which is provided on a path through which power is supplied from the power supply to the lamp part, and comprises a connector assembly provided on one side of the inverter board,
   wherein the connector assembly comprises:
      at least one female connector in which a plurality of socket accommodators provided to supply the power to the lamps is formed as one body; and
      at least one male connector on which a plurality of socket connectors connected to the socket accommodators is formed as one body,
      wherein the plurality of socket connectors are arranged in groups and each group of socket connectors is electrically connected to one of the plurality of the lamps.

2. The back light unit according to claim 1, wherein a number of the lamps is $2^n$, wherein n is a natural number.

3. The back light unit according to claim 2, wherein each lamp comprises a hot terminal and a cold terminal, and each socket connector comprises a hot socket connector and a cold socket connector which are electrically connected to the hot terminal and the cold terminal, respectively.

4. The back light unit according to claim 3, wherein a hot pin and a cold pin which are electrically connected to the hot terminal and the cold terminal of each lamp are provided in each socket accommodator of the female connector.

5. The back light unit according to claim 3, wherein the female connector is provided on the inverter board, and is arranged on a side of the hot terminal.

6. The back light unit according to claim 1,
   wherein the inverter board further comprises a transformer which is provided on the inverter board and transforms the power supplied from the power supply, and
   wherein the transformer and the female connector are formed as one body.

7. The back light unit according to claim 6, wherein the transformer is arranged substantially parallel with the female connector, and disposed a predetermined distance from the female connector on the inverter board.

8. The back light unit according to claim 6, wherein the transformer is partitioned to correspond to the respective lamps.

9. The back light unit according to claim 1, wherein the female connector comprises a first spacer which is provided between the socket accommodators and separates the socket accommodators.

10. The back light unit according to claim 9, wherein the male connector comprises a second spacer which is located to correspond to the first spacer.

11. The back light unit according to claim 1, wherein a number of the socket accommodators is four.

12. The back light unit according to claim 11, wherein a number of the socket connectors is four.

13. A display apparatus comprising:
   a power supply;
   a lamp part which comprises a plurality of lamps; and
   an inverter board which is provided on a path through which power is supplied from the power supply to the lamp part, and comprises a connector assembly provided on one side of the inverter board,
   wherein the connector assembly comprises:
      at least one female connector in which a plurality of socket accommodators provided to supply the power to the lamps is formed as one body; and
      at least one male connector in which a plurality of socket connectors connected to the socket accommodators is formed as one body,
      wherein the plurality of socket connectors are arranged in groups and each group of socket connectors is electrically connected to one of the plurality of the lamps.

14. The display apparatus according to claim 13, wherein a number of the lamps is $2^n$, wherein n is a natural number.

15. The display apparatus according to claim 14, wherein each lamp comprises a hot terminal and a cold terminal, and each socket connector comprises a hot socket connector and a cold socket connector which are electrically connected to the hot terminal and the cold terminal of the lamp, respectively.

16. The display apparatus according to claim 13,
wherein the inverter board further comprises a transformer which is provided on the inverter board and transforms the power supplied from the power supply, and
wherein the transformer and the female connector are formed as one body.

17. The display apparatus according to claim 16, wherein the transformer is arranged substantially parallel with the female connector, and disposed a predetermined distance from the female connector on the inverter board.

18. The display apparatus according to claim 16, wherein the transformer is partitioned to correspond to the respective lamps.

19. The display apparatus according to claim 13, wherein the female connector comprises a spacer which is provided between the socket accommodators and separates the socket accommodators.

20. The display apparatus according to claim 13, wherein a number of the socket accommodators is four.

* * * * *